(12) United States Patent
Natter et al.

(10) Patent No.: US 8,202,124 B1
(45) Date of Patent: Jun. 19, 2012

(54) CONTACT AND RECEPTACLE ASSEMBLY FOR A VEHICLE CHARGING INLET

(75) Inventors: Brantley Natter, Brighton, MI (US); Slobodan Pavlovic, Novi, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 13/045,976

(22) Filed: Mar. 11, 2011

(51) Int. Cl.
*H01R 13/66* (2006.01)

(52) U.S. Cl. .................... 439/620.21; 439/225

(58) Field of Classification Search ............ 439/620.22, 439/620.21, 620.01, 225; 320/104
See application file for complete search history.

(56) References Cited

U.S. PATENT DOCUMENTS

| | | | | |
|---|---|---|---|---|
| 1,665,987 A | * | 4/1928 | Smith | 439/225 |
| 2,449,150 A | * | 9/1948 | Schnoll | 340/656 |
| 3,016,512 A | * | 1/1962 | Borchard | 439/225 |
| 3,234,464 A | * | 2/1966 | Cook | 324/122 |
| 3,315,210 A | * | 4/1967 | Cull | 439/53 |
| 4,113,341 A | | 9/1978 | Hughes | |
| 4,515,422 A | * | 5/1985 | Pritulsky | 439/82 |
| 4,606,597 A | | 8/1986 | Bielefeld | |
| 4,752,247 A | * | 6/1988 | Warnars | 439/684 |
| 5,238,429 A | | 8/1993 | Margrave et al. | |
| 5,252,937 A | * | 10/1993 | Bernier et al. | 335/202 |
| 5,692,917 A | * | 12/1997 | Rieb et al. | 439/225 |
| 6,109,973 A | | 8/2000 | Gronowicz, Jr. et al. | |
| 6,402,555 B1 | | 6/2002 | Garcia et al. | |
| 6,613,979 B1 | * | 9/2003 | Miller et al. | 174/541 |
| 6,851,982 B2 | | 2/2005 | Ku | |
| 7,063,570 B1 | | 6/2006 | Coyle et al. | |
| 2003/0045139 A1 | | 3/2003 | Hanson | |
| 2010/0079105 A1 | | 4/2010 | Iwanaga et al. | |

OTHER PUBLICATIONS

SAE International, Surface Vehicle Recommended Practice, J1772, SAE Electric Vehicle and Plug in Hybrid Electric Vehicle Conductive Charge Coupler, Issued Oct. 1996, Revised Proposed Draft Aug. 2009, Superseding J1772, Nov. 2001.

* cited by examiner

*Primary Examiner* — Phuong Dinh
(74) *Attorney, Agent, or Firm* — Brooks Kushman P.C.

(57) ABSTRACT

A contact is provided having a tubular body that defines an internal cavity. The body is configured for elastically deforming to receive a terminal within the cavity. An elongate member extends from the body. A retention tab extends from the elongate member; and includes a slot formed therein for receiving a lead of an electrical component. A circuit is also provided, which includes a pair of the contacts that are connected to the electrical component. A receptacle assembly is provided for supporting the circuit. A method is also provided for forming the contact and assembling the circuit to the receptacle assembly.

20 Claims, 4 Drawing Sheets

CONTACT AND RECEPTACLE ASSEMBLY FOR A VEHICLE CHARGING INLET

TECHNICAL FIELD

One or more embodiments relate to a contact for receiving a terminal for a vehicle charging inlet, and a receptacle assembly for supporting a contact and a terminal for a vehicle charging inlet.

BACKGROUND

One example of a contact is disclosed in U.S. Patent Application Publication Number 2003/0045139 to Hanson.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
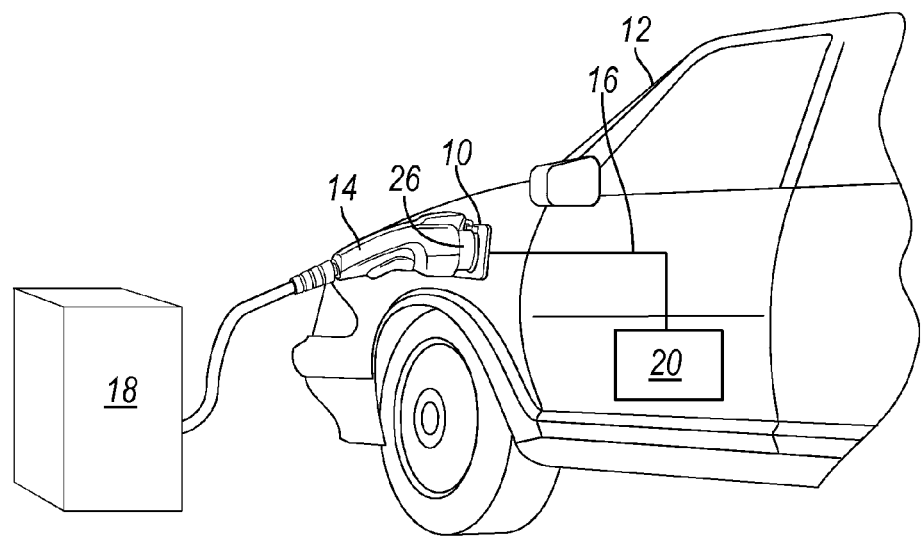
FIG. 1 is a schematic view of a receptacle assembly in accordance with an embodiment, illustrated mounted to a vehicle and connected to a charging cable.

With reference to FIG. 1, a receptacle assembly is illustrated in accordance with an embodiment and is generally referenced by numeral 10. The receptacle assembly 10 is mounted to a vehicle 12 and provides a charging inlet to the vehicle for receiving electrical energy. The receptacle assembly 10 connects a charging cable connector 14 to a vehicle harness 16. The charging cable connector 14 extends from an external power supply 18 for providing electrical energy. The vehicle harness 16 connects to a battery 20, for storing the electrical energy by charging the battery 20.

Figure 2:
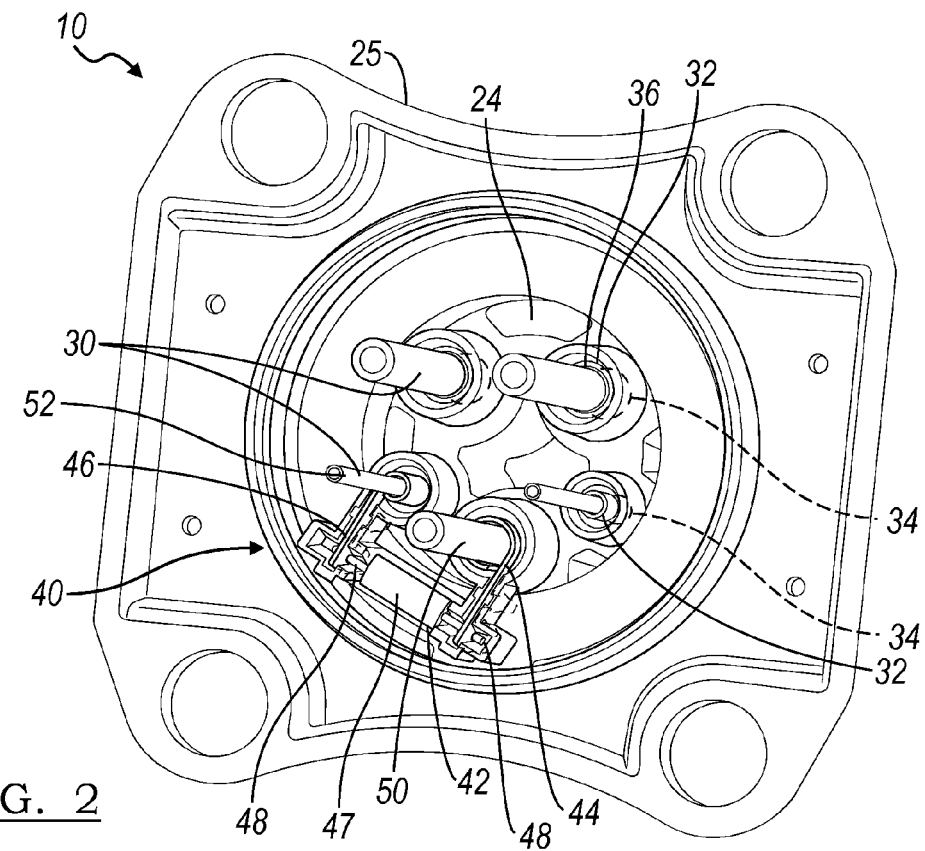
FIG. 2 is a rear perspective view of the receptacle assembly of FIG. 1.

Referring to FIGS. 1 and 2, the receptacle assembly 10 includes a base 24 and a flange 25 for mounting to the vehicle 12. FIG. 2 illustrates a rear view of the receptacle assembly 10. The base 24 is disposed over an aperture (not shown) formed into an external panel of the vehicle 12. The flange 25 extends outward from the base 24 as illustrated. The flange 25 is contoured for mounting to the vehicle 12. The receptacle assembly 10 also includes an external receptacle 26 for receiving the charging cable connector 14. The external receptacle 26 extends from the base 24 in a first direction away from the vehicle 12. In one embodiment, the receptacle assembly 10 includes a lid (not shown) that is pivotally connected to an external surface of the receptacle assembly 10, and disposed over a distal end of the external receptacle 26 for sealing the receptacle 26.

The receptacle assembly 10 is attached to the vehicle harness 16. The vehicle harness 16 includes a plurality of individual wires 30, which are illustrated in FIG. 2. A terminal 32 is attached to an end of each wire 30. A plurality of apertures 34 are formed through the base 24 for receiving the terminals 32. Each terminal 32 includes a proximal end 36 and a distal end 38 (shown in FIG. 3). The proximal end 36 of each terminal 32 is attached to the wire 30 and received by one of the apertures 34 formed in the base 24. The distal end 38 of each terminal 32 extends externally from the base 24 for connecting with a mating terminal (not shown) of the charging cable connector 14.

The interface between the receptacle assembly 10 and the charging cable connector 14 may be specified in an effort to standardize the connection throughout the electric vehicle industry. For example the Society of Automotive Engineers ("SAE") has specified such an interface in SAE J1772, which is hereby incorporated by reference. According to at least one embodiment, the interface between the receptacle assembly 10 and the charging cable connector 14 includes five male terminals 30 ("pins"). The interface specified in SAE J1772 includes five circuits, which correspond to the following functions: AC Power Line 1 (L1), AC Power Line 2 (L2, N), chassis ground, control pilot, and proximity detection. However, the receptacle assembly 10 is not limited by this SAE specification and may be utilized for applications specifying other interface requirements.

The receptacle assembly 10 includes a circuit 40 for electrically connecting two of the terminals 32 according to one embodiment. The circuit 40 includes a resistor 42, a primary contact 44, and a secondary contact 46 that are connected to each other. The resistor 42 includes a body 47 with a pair of conductive leads 48 extending from the body 47. The electrical component 42 may be any discrete electrical device for a particular application. According to another embodiment, the circuit 40 has a capacitor 42. According to yet another embodiment, the circuit 40 has a diode 42. Each contact 44, 46 connects the proximal end 36 of one of the terminals 32 to one of the leads 48 of the resistor 42.

For example, in one embodiment the circuit 40 is utilized for proximity detection. The vehicle harness 16 includes a chassis ground circuit 50 with a wire 30 that is connected to a grounded portion of the chassis (not shown) of the vehicle 12. The vehicle harness 16 also includes a proximity detection circuit 52 with a wire 30 that is connected to a power supply, such as battery 20, (FIG. 1) within the vehicle 12. The primary contact 44 connects the terminal 32 of the chassis ground circuit 50 to a lead 48 of the resistor 42. The secondary contact 46 connects the terminal 32 of the proximity detection circuit 52 to another lead 48 of the resistor 42. The resistor 42 has a resistance value of approximately 2.7 kilo-ohms. The charging cable connector 14 includes a resistive load (not shown) of approximately 480 ohms that is electrically connected in parallel to the resistor 42. A controller (not shown) monitors the proximity detection circuit 52 to determine when the connection is made to the charging cable connector 14. However, the circuit 40 is not limited by this embodiment and may be utilized for electrically connecting other combinations of terminals 32 within the receptacle assembly 10.

Figure 3:
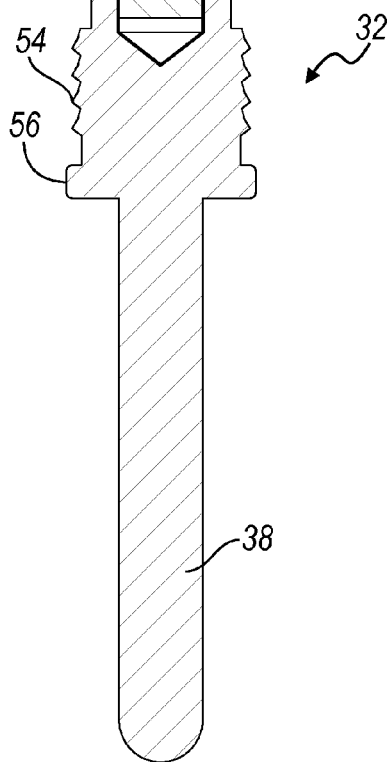
FIG. 3 is a section view of a terminal of the receptacle assembly of FIG. 1.

Referring to FIG. 3, the terminal 32 includes features for attaching to the receptacle assembly 10. According to one embodiment, peripheral barbs 54 extend peripherally from an intermediate portion of the terminal 32, between the proximal end 36 and the distal end 38. The barbs 54 extend beyond the inner diameter of the apertures 34 in the base 24 (shown in FIG. 4) for providing an interference fit between the terminal 32 and the base 24. This interference fit helps retain the terminals 32 in the receptacle assembly 10. An end stop 56 is also formed in an intermediate portion of the terminal 32, between the barbs 54 and the distal end 38. The end stop 56 extends radially beyond the barbs 54 for contacting the base 24 and limiting an insertion depth of the terminal 32.

Figure 4:
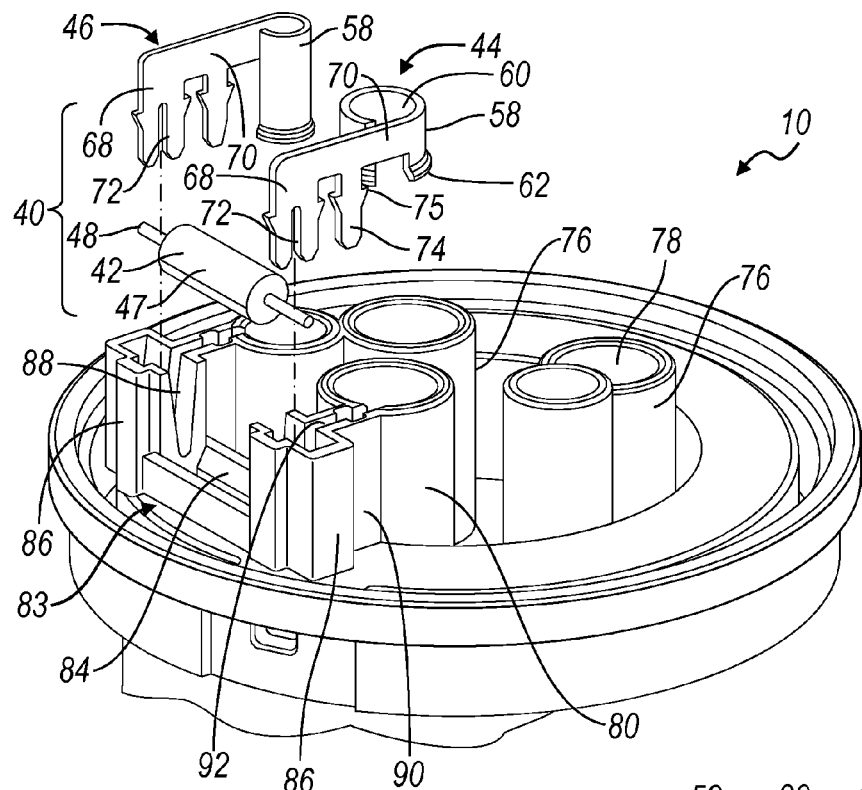
FIG. 4 is an exploded side perspective view of the receptacle assembly of FIG. 1.
Figure 5:
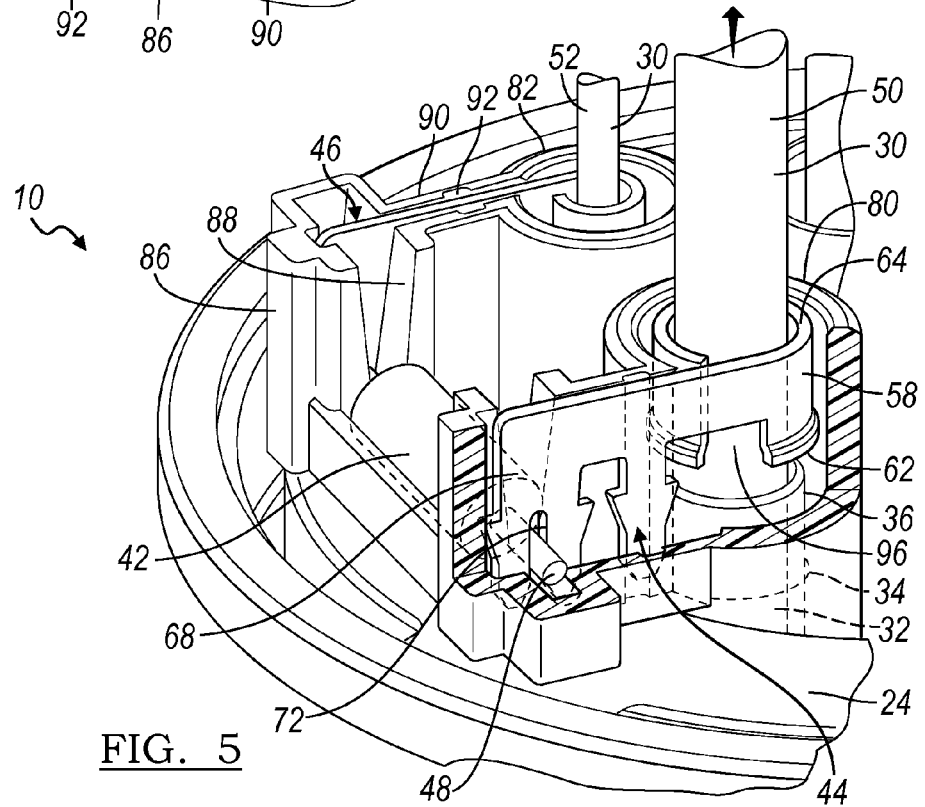
FIG. 5 is a partially fragmented view of the receptacle assembly of FIG. 1.

Referring to FIGS. 3-5, the primary contact 44 and the secondary contact 46 each connect to one of the terminals 32. Each contact 44, 46 includes a tubular body 58. The body 58 defines an internal cavity 60 having a substantially cylindrical shape. The body 58 receives the proximal end 36 of the terminal 32 within the cavity 60, according to one embodiment. The body 58 is discontinuous about a circular periphery (split), which allows the body 58 to function as a coil spring and elastically deform in a radial direction to receive the proximal end 36 of the terminal 32. The body 58 provides clearance to the wire 30; and provides an interference fit to the outer diameter of the proximal end 36.

For example, in one embodiment of the receptacle assembly 10, the primary contact 44 includes a body 58 having an inner diameter of approximately 4.9 millimeters. The body 58 receives a ten gage wire and a terminal 32 having a proximal end 36 with an outer diameter of approximately 5.0 millimeters. The inner diameter of the body 58 is smaller than the outer diameter of the proximal end 36, and therefore the body 58 elastically deforms to receive the proximal end 36. The body 58 maintains a radial spring force acting on the proximal end 36 of the terminal 32. This spring force helps maintain the electrical connection between the terminal 32 and the contact 44.

Each contact 44, 46 includes a first end 62 that diverges outward from body 58. The first end 62 is disposed adjacent to one of the apertures 34 in the base 24 for receiving the distal end 38 of the terminal 32 and providing an alignment aid during assembly. Each receptacle also includes a second end 64 formed opposite to the first end 62.

The contacts 44, 46 each include a retention tab 68 for connecting to the resistor 42. The retention tab 68 is connected to the split tubular body 58 by an elongate member 70. The retention tab 68 extends perpendicularly from an end of the elongate member 70 toward the base 24. A slot 72 is formed into a distal end of the retention tab 68 for receiving one of the leads 48 of the resistor 42. The elongate member 70 extends tangentially from a second end 64 of the contact 56, according to one embodiment.

The contacts 44, 46 include features for attaching to the receptacle assembly 10, such as a locking tab 74 that extends from the elongate member 70, according to one embodiment. The locking tab 74 may extend perpendicularly from an intermediate portion of the elongate member 70 between the retention tab 68 and the contact 56. The locking tab 74 and the retention tab 68 include edge barbs 75 that extend outward for attaching the contacts 44, 46 to the receptacle assembly 10.

The receptacle assembly 10 includes a plurality of terminal receptacles 76 for supporting the terminals 32. The terminal receptacles 76 extend from the base 24 and toward the vehicle 12. Each terminal receptacle 76 is formed about and generally coaxial with one of the apertures 34. Each terminal receptacle 76 defines a terminal cavity 78 for receiving the proximal end 36 of one of the terminals 32.

The receptacle assembly 10 includes a primary terminal receptacle 80 for receiving the body 58 of the primary contact 44; and a secondary terminal receptacle 82 for receiving the body 58 of the secondary contact 46. The terminal cavities 78 formed in each of the primary terminal receptacle 80 and the secondary terminal receptacle 82 provide clearance to the first end 62 of the corresponding contacts 44, 46 to allow for elastic deformation.

The receptacle assembly 10 also includes a circuit receptacle 83 for supporting the circuit 40. The circuit receptacle 83 extends from the base 24. The circuit receptacle includes a mount 84 for receiving the body 47 of the resistor 42. The mount 84 is oriented proximate to the primary and secondary terminal receptacles 80, 82. The circuit receptacle 83 also includes a pair of end supports 86 that extend from the base 24 at opposing ends of the mount 84. Each end support 86 has a groove 88 formed into an inner surface. Each groove 88 receives a lead 48 of the resistor 42, and converges at the mount 84 for locating the resistor 42 during assembly. The circuit receptacle 83 also includes walls 90 that extend between the end supports 86 and the primary terminal receptacle 80 and secondary terminal receptacle 82. A channel 92 is formed into each wall 90 and projects into the end support 86 and corresponding first and secondary terminal receptacle 80, 82 for receiving the elongate members 70.

FIGS. 4 and 5 illustrate a method for assembling the receptacle assembly 10, for at least one embodiment. First, the circuit 40 is attached to the base 24. The leads 48 of the resistor 42 are aligned with the grooves 88; and the body 58 of the resistor 42 is placed on the mount 84. The split tubular bodies 58 are inserted into the terminal cavities 78 of the corresponding terminal receptacles 80, 82. The elongate members 70 are inserted into the corresponding channels 92; and the retention tabs 68 engage the corresponding leads 48 of the resistor 42. The retention tabs 68 capture the leads 48 between the contacts 44, 46 and the base 24, for retaining the resistor 42.

Next, the vehicle harness 16 is attached to the receptacle assembly 10. An end of each wire 30, opposite the end having the terminal 32, is inserted through an aperture 34 of the base 24. The wire 30 translates through the base 24 until the proximal end 36 of each terminal 32 passes through an aperture 34 and into a terminal cavity 78. The terminal 32 that is inserted into the primary terminal receptacle 80 engages the body 58 of the primary contact 44; and the terminal 32 that is inserted into the secondary terminal receptacle 82 engages the body 58 of the secondary contact 46.

The fragmented portion of FIG. 4 illustrates the insertion of a terminal 32 into the receptacle assembly 10, prior to engaging the body 58 of the primary contact 44. FIG. 3 illustrates the installed position of the terminal 32, where the proximal end 36 of the terminal 32 is received within the cavity 60 of the body 58.

Additionally, the circuit 40 is encapsulated within the circuit receptacle 83 by a molded thermoplastic material (not shown), according to one embodiment. The molded material helps insulate and seal the contacts 44, 46 and the resistor 42. Alternate embodiments of the receptacle assembly 10 include contacts 44, 46 having tabs (not shown) that extend away from the base 24. For such embodiments, the resistor 42 may be installed after the contacts 44, 46, and retained within the receptacle assembly 10 by the molded material.

Figure 6:
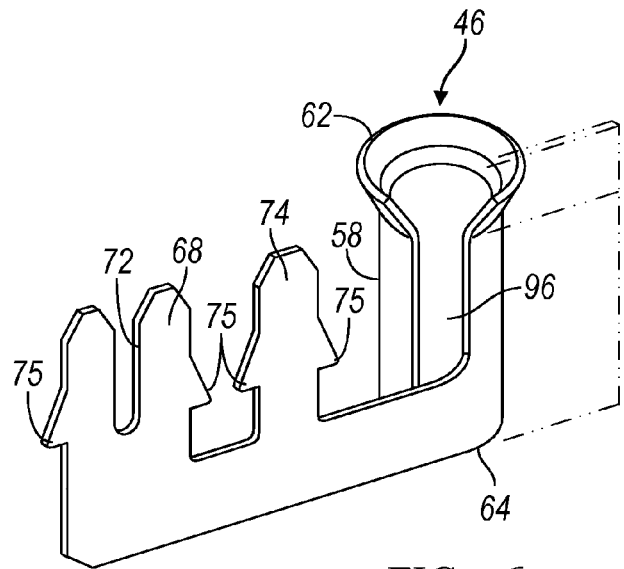
FIG. 6 is a side perspective view of a contact of the receptacle assembly of FIG. 1.

With reference to FIGS. 3 and 6, the primary and secondary contacts 44, 46 are formed by stamping a unitary strip of conductive material having an elongate length, according to one embodiment. The retention tab 68 and the locking tab 74 may be formed during the stamping process. A secondary operation is used to wrap a proximal end of the strip (shown in phantom) lengthwise to form the split tubular body 58. This process results in a gap 96 formed in an outer peripheral portion of the body 58, that extends between the first end 62 and the second end 64. Alternatively, the body 58 may be formed as a separate component and welded (e.g., ultrasonic weld) to the elongate member 70.

The interface, or contact area, between the terminal 32 and the body 58 of the contact 44, 46 affects the resistance of the circuit 40. As contact area decreases, the electrical resistance increases. The geometry of the contact area may be affected by design and manufacturing processes. For example, the proximal end 36 of the terminal 32 may be attached to the wire 30 by mechanical means, such as crimping. Crimping the terminal 32 may deform the outer diameter of the proximal end 36, which may reduce the contact area at the interface. Additionally, since there is no contact along the gap 96 formed in the body 58; the size of the gap 96 also affects contact area.

The electrical resistance of the circuit 40 affects measurements taken along the proximity circuit 52. One prior art example of a circuit teaches wrapping the leads of an electrical component around each terminal and then soldering the leads to the terminal. Such prior art wrapped and soldered connections do not provide robust electrical connections, because the leads and the soldered connections are prone to breaking, and provide variable resistance values. The illustrated embodiment includes contacts 44, 46 that connect to proximal ends 36 of terminals 32 by contact, which results in lower and more consistent resistance values. For example, in one embodiment the electrical resistance of each contact 44, 46 is approximately 1.5 milliohms.

Figure 7:
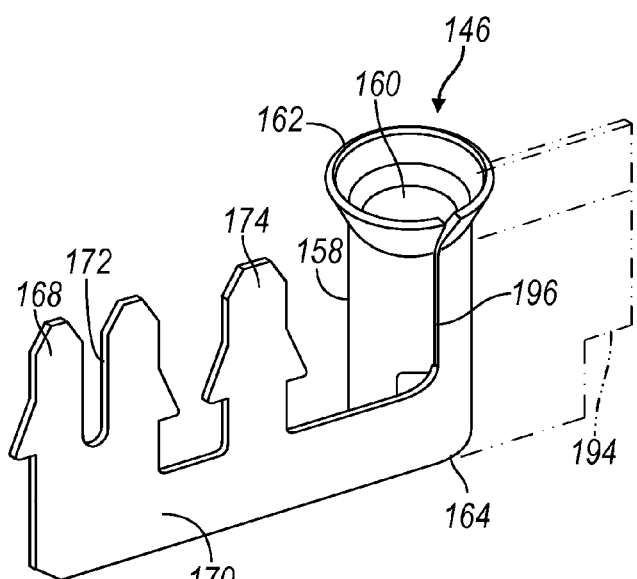
FIG. 7 is a side perspective view of a contact according to another embodiment.

With reference to FIGS. 6-7, a secondary contact is illustrated in accordance with an embodiment and is generally referenced by numeral 146. The secondary contact 146 may be utilized with the receptacle assembly 10 of FIGS. 1-4. The secondary contact 146 includes a split tubular body 158 that defines an internal cavity 160. The body 158 includes a first end 162 and a second end 164 opposite the first end 162. The secondary contact 146 includes a retention tab 168 that is connected to the body 158 by an elongate member 170. The secondary contact 146 is formed by stamping an elongate strip of conductive material. The strip includes a transverse notch 194 formed into a distal end of the strip (shown in phantom). The notch 194 provides clearance to the elongate member 170 when the distal end of the strip is wrapped lengthwise to form the body 158.

The secondary contact 146 of FIG. 7, has a larger contact area between the body 158 and terminal 32, than the secondary contact 46 of the embodiment illustrated in FIG. 6. The split tubular body 158 forms a minimal gap 196, and has a contact area that spans approximately three hundred and sixty degrees about the internal surface of the body 158. By increasing the contact area (reducing the gap 196); the electrical resistance of the secondary contact 146 decreases. Additionally, the increased contact area of the secondary contact 146 improves manufacturability by providing a smoother interface for the terminal 32 to engage during insertion.

Figure 8:
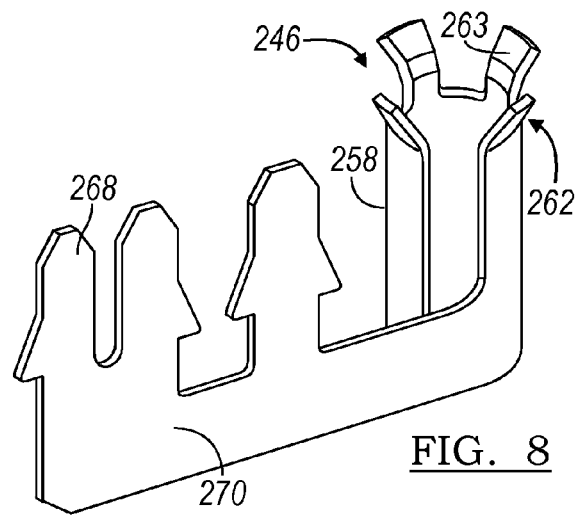
FIG. 8 is a side perspective view of a contact according to yet another embodiment.

FIG. 8 illustrates a secondary contact 246 according to yet another embodiment. The secondary contact 246 includes a split tubular body 258 and a retention tab 268 that are connected to each other by an elongate member 270. The body 258 includes a first end 262 that diverges away from the body 258. A series of circumferentially spaced apart projections 263 are formed in the first end 262. The secondary contact 246 is formed by stamping an elongate strip of conductive material. The strip includes the spaced apart projections 263 formed into a distal end of the strip.

The secondary contact 246 is configured for manual insertion applications. The projections 263 formed in the first end 262 of the body 258 elastically deform under a lower axial load, than the generally continuous first end 162 of the secondary contact 146 illustrated in FIG. 7. The secondary contact 246 is suited for applications where the terminal 32 is manually inserted; or when the terminal 32 is inserted and removed multiple times (multiple mating cycles).

Figure 9:
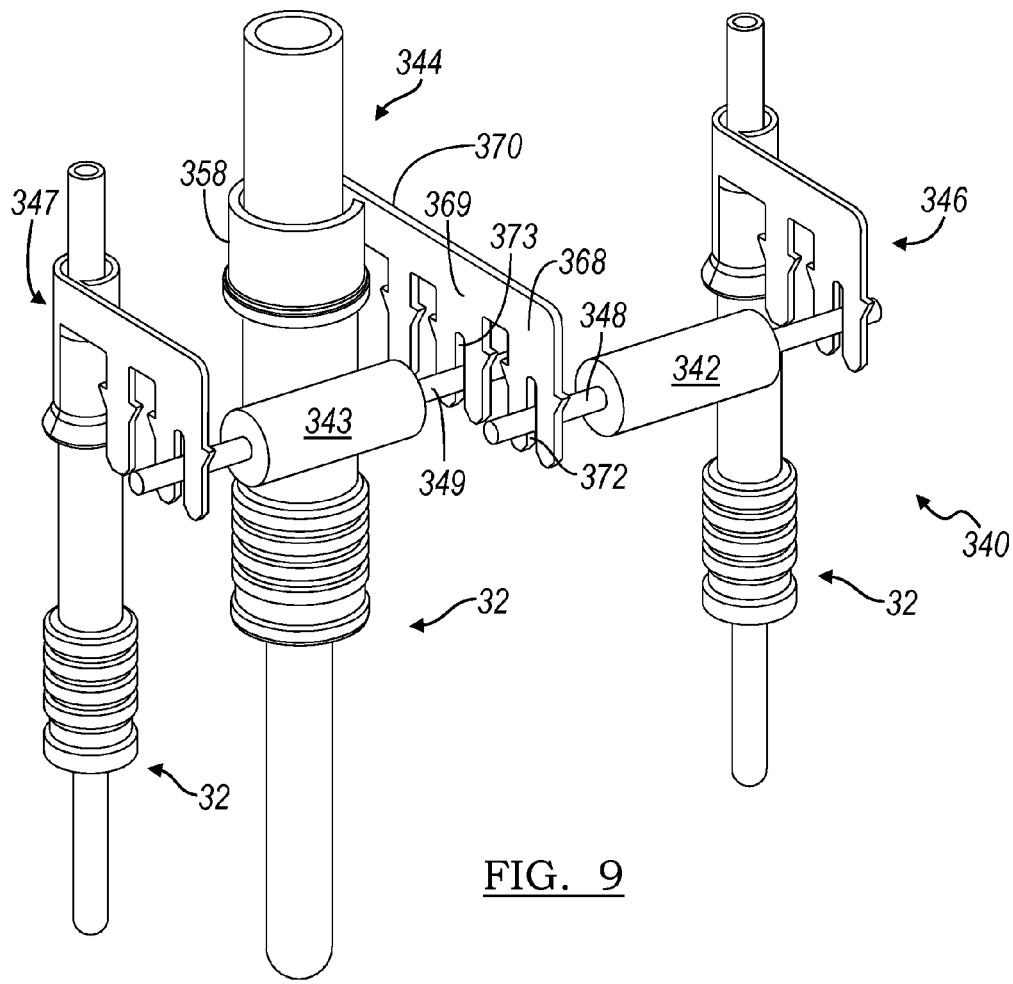
FIG. 9 is a side perspective view of a circuit according to still yet another embodiment.

FIG. 9 illustrates a circuit 340 according to still yet another embodiment. The circuit 340 includes a primary contact 344 that is electrically connected to at least three terminals 32. The primary contact 344 includes a split tubular body 358 and a retention tab 368 that are connected to each other by an elongate member 370. The retention tab 368 includes a slot 372 formed into a distal end, for receiving a lead 348 of a first electrical component 342. The first electrical component 342 is interconnected between the primary contact 344 and a first secondary contact 346. The primary contact 344 includes a second tab 369 extending from the elongate member 370 between the retention tab 368 and the body 358. The second tab 369 includes a slot 373 formed into a distal end for receiving a lead 349 of a second electrical component 343. The second electrical component 343 is interconnected between the primary contact 344 and a second secondary contact 347.

While embodiments of the present invention are described above, it is not intended that these embodiments describe all possible forms of the present invention. Rather, the words used in the specification are words of description rather than limitation, and various changes may be made without departing from the spirit and scope of the present invention. Additionally, the features of various implementing embodiments may be combined to form further embodiments of the present invention.

What is claimed:

1. A contact comprising:
   a tubular body defining a cavity within, the body being configured for elastically deforming to receive a terminal within the cavity;
   an elongate member extending from the body; and
   a retention tab extending from the elongate member, the retention tab having a slot formed therein for receiving a lead of an electrical component.

2. The contact of claim 1 wherein the tubular body comprises a split tubular body having an axially extending gap formed through an external surface of the body for facilitating elastic deformation.

3. A circuit comprising:
   a pair of contacts according to claim 1; and
   an electrical component received within the slots of the contacts.

4. The circuit of claim 3 wherein the electrical component comprises a resistor.

5. The contact of claim 1 further comprising a first end diverging outward from the tubular body for receiving a proximal end of the terminal.

6. The contact of claim 5 wherein the first end comprises a series of projections circumferentially spaced apart from each other.

7. The contact of claim 1 further comprising a second retention tab extending from the elongate member between the retention tab and the body, the second retention tab having a slot formed therein for receiving a lead of a second electrical component.

8. A receptacle assembly comprising:
a base for mounting to a vehicle panel, the base having apertures formed through for receiving terminals;
an external receptacle extending from the base in a first direction for receiving a charging cable connector; and
at least one terminal receptacle extending from the base in a second direction, opposite the first direction, the terminal receptacle being formed about one of the apertures and defining a terminal cavity for receiving a tubular body of a contact according to claim 1.

9. The receptacle assembly of claim 8 further comprising a circuit receptacle extending from the base in the second direction for receiving the electrical component, and the contact.

10. The receptacle assembly of claim 9 wherein the retention tab extends perpendicularly from elongate member to capture the electrical component between the contact and the base.

11. A receptacle assembly comprising:
a base for mounting to a vehicle panel, the base having apertures formed through for receiving terminals;
an electrical component disposed on the base; and
a pair of contacts attached to the base, each contact comprising:
a tubular body defining a cavity within, the body being aligned with one of the apertures in the base and configured for elastically deforming to receive the terminal,
an elongate member extending from the body, and
a retention tab extending from the elongate member, the retention tab having a slot formed therein for receiving the electrical component.

12. The receptacle assembly of claim 11 further comprising:
an external receptacle extending from the base in a first direction for receiving a charging cable connector; and
at least two terminal receptacles extending from the base in a second direction, opposite the first direction, each terminal receptacle being formed about one of the apertures and defining a terminal cavity for receiving the tubular body.

13. A method for assembling a circuit to a receptacle assembly, the method comprising:
providing a receptacle assembly having a base with a plurality of apertures formed through;
providing a circuit comprising a contact and a secondary contact interconnected by an electrical component, wherein each contact includes a tubular body;
attaching the contacts to the base, such that each tubular body is axially aligned with one of the apertures;
providing a wire harness comprising a plurality of wires, each wire having a terminal attached to a first end of the wire;
inserting a second end of each wires through one of the apertures; and
translating at least two of the wires through the receptacle assembly until a proximal end of the terminal engages the body of the contact.

14. The method of claim 13 further comprising:
depositing a molded material over the circuit for sealing the contacts and the electrical component to the base.

15. The method of claim 13 further comprising:
stamping a strip of conductive material having an elongate length with a proximal end and a distal end; and
wrapping the proximal end of the strip lengthwise towards the distal end to form the tubular body.

16. The method of claim 15 further comprising forming a retention tab into the distal end of the strip, the retention tab having a slot formed therein for receiving the electrical component.

17. The method of claim 16 further comprising forming a second retention tab into the strip between the retention tab and the body, the second retention tab having a slot formed therein for receiving a lead of a second electrical component.

18. The method of claim 13 further comprising forming a flared opening into a first end of the tubular body.

19. The method of claim 15 further comprising forming a series of spaced apart projections into the proximal end of the strip.

20. The method of claim 15 further comprising forming a transverse notch into the proximal end of the strip for receiving an elongate member.

\* \* \* \* \*